United States Patent [19]

Lee

[11] 4,353,769

[45] Oct. 12, 1982

[54] RADAR TRANSPARENT RIGID POLYURETHANE LAMINATE SYSTEMS FOR RADOMES

[76] Inventor: Henry J. Lee, 12 Knollwood Dr., Cherry Hill, N.J. 08002

[21] Appl. No.: 193,859

[22] Filed: Oct. 3, 1980

[51] Int. Cl.$^3$ ............................................... B32B 31/12
[52] U.S. Cl. ................................. 156/299; 156/307.4; 156/331.4; 361/218; 427/379; 427/389.8; 428/290; 428/425.6
[58] Field of Search ............... 427/389.8, 393.5, 407.3, 427/389.9, 379; 361/218, 220, 212, 216, 219; 428/288, 289, 290, 224, 285, 425.6; 156/181, 307.1, 307.3, 331.1, 331.4, 299; 528/67

[56] References Cited

U.S. PATENT DOCUMENTS

| | | | |
|---|---|---|---|
| 3,616,185 | 10/1971 | Goldberg | 427/407.3 X |
| 3,619,338 | 11/1971 | Gilman et al. | 156/331.4 X |
| 3,878,036 | 4/1975 | Chang | 156/331.4 X |
| 4,098,943 | 7/1978 | Degginger et al. | 428/283 |
| 4,153,594 | 5/1979 | Wilson, Jr. | 428/426 X |

*Primary Examiner*—Thurman K. Page
*Attorney, Agent, or Firm*—R. S. Sciascia; Henry Hansen

[57] ABSTRACT

A polyurethane-quartz laminate suitable for aircraft radomes. Controlled amounts of a mixture of unpolymerized 4,4 diphenyl methane diisocyanate (MDI) and 2,4 toluene diisocyanate (TDI) are polymerized with ethylene glycol at a preselected temperatures and periods to produce a polymeric resin of relatively few nonpolar isocyanate groups. The resin is impregnated and cured in layers of quartz cloth to form a relatively high strength composite or laminate having a low dielectric constant.

8 Claims, No Drawings

RADAR TRANSPARENT RIGID POLYURETHANE LAMINATE SYSTEMS FOR RADOMES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to rigid polyurethane resins and composite materials, and more particularly to aircraft radome materials, and the fabrication thereof, which are transparent to high radar frequencies.

Aircraft radomes are generally constructed in a streamlined configuration of composite materials which are particularly transparent to high frequency electromagnetic radiation. Naval aircraft are usually equipped with radomes fabricated from laminates of epoxy resins and glass cloth, but current developments of high performance aircraft and higher frequency radar systems, render these materials unsuitable. The wall thickness of these materials must be increased to withstand the increased airloads and environmental demands such as rain errosion, thermal changes and buffeting, but the increase adversely effects the radome's transparency. Similarly, operation at higher radar frequencies (i.e. shorter wavelengths) also reduces the transparency.

In general radome materials have low dielectric constants and low loss tangents are better for high frequency applications. See von Hippel; *Dielectric Materials and Application;* MIT Technology Press, 1954. Typical radomes have been fabricated from composites of polyfluorocarbons, polyester and epoxy with glass or quartz fillers, or with laminates of quartz or glass cloth impregnated with these resins. At best, these composites offer a minimum dielectric constant of about 3.25 and loss tangents of 0.015. U.S. Pat. No. 3,577,493 for "Method of Fabricating a Glass Fabric Laminate Material", issued May 4, 1971 to Henry J. Lee, discloses a laminate of polyurethane resin and glass with a low resin-to-glass ratio (20:80) for achieving improved structural properties (flexural strength and elasticity), but it offers no reduction in dielectric constant (4.3). It is theorized that by reducing the polarity of the polymeric molecule of the resin (Daniels et al, *Experimental Physical Chemistry,* McGraw-Hill, N.Y., 1962; and Pauling, *Nature of the Chemical Bond,* Cornell University Press, Ithica, N.Y., 1960), and with a proper resin-to-quartz ratio, a dielectric constant of 3.0 or lower is obtainable. The resin synthesis in U.S. Pat. No. 3,577,493 supra utilizes dimers and trimers formed from the 4,4'-MDI (diphenyl methane diisocyanate) monomer. When these polymers are reacted with ethylene glycol, large concentrations of molecules having polar groups, including isocyanates, can form which are electrically dissymmetrical and thereby proportionately increase the dielectric constant. See Ander and Sonnessa, *Principals of Chemistry;* MacMillan Company; 1965; pages 146–147.

SUMMARY OF THE INVENTION

Accordingly, it is a general purpose and object of the present invention to provide a radome composite which significantly increases the transparency to radar frequencies with no substantial trade-off of structural properties. Another object is to provide a polyurethane resin having a low concentration of electrically dissymmetrical polar molecules for achieving a low dielectric constant and low loss tangent, and which is suitable for fabricating laminated composites of comparably low dielectric constants. Still another object is to provide a composite of comparable strength and elasticity comparable to existing resin-quartz composites but with greater transparency at higher radar frequencies.

Briefly, these and other objects of the invention are achieved by regulating the shape of the polymeric molecule of the resin and by reducing the presence of free isocyanate groups (N=C=O) in the molecule through the use of suitable reactant ratios and by limiting the extent of the reaction. More specifically, 4,4'-MDI (diphenyl methane diisocyanate) is heated to the melt temperature, but short of polymerization, and then mixed with controlled amounts of 2,4-TDI (toluene diisocyanate). The mixture is reacted with ethylene glycol at selected times and temperatures to form a polyurethane resin having a low concentration of polar groups. The resin is impregnated and cured in layers of quartz cloth to the desired thickness and contour to form a relatively high strength composite or laminate with low dielectric constant and low loss tangent which is particularly useful in radomes.

DESCRIPTION OF THE PREFERRED EMBODIMENT

In accordance with the present invention, the composite material is fabricated from a plurality of layers of quartz cloth impregnated and cured with a polyurethane resin having a low concentration of polar groups in the molecules. The resin is formed by heating and melting the solid monomer of 4,4'-MDI (diphenyl methane diisocyanate) to a clear liquid at 37°–40° C. The heating is promptly terminated to prevent any polymerization into dimers or trimers. The liquid is then thoroughly mixed with 2,4-TDI (toluene diisocyanate) to form a mixture of diisocyanates that will react selectively with the ethylene glycol to be added. Ethylene glycol, $C_2H_4(OH)_2$ is then slowly added to the mixture, preferably with a dropping funnel, to prevent the reaction product from exceeding 80° C. his is to assure polymerization without cross-linking. Being a short chain molecule, the glycol gives stiffness to the polymer product. The reaction product is then heated for 10–17 hours at 102°–110° F. to increase the extent of the reaction short of cross-linking, and yet sufficient to form a polyurethane resin of proper viscosity for optimum wetting of the quartz cloth in laminate fabrication. General equations for the reactions which take place are as follows:

I.
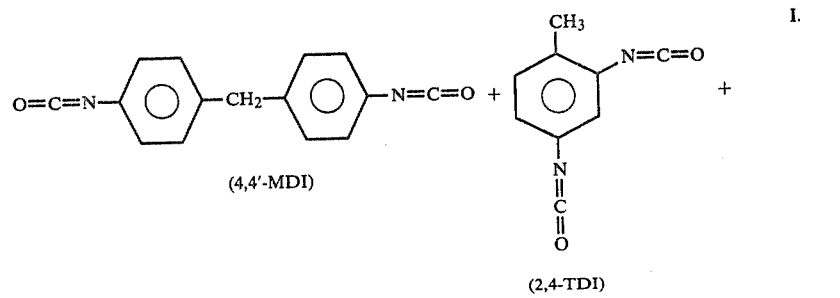
(4,4'-MDI)    (2,4-TDI)
HOCH₂CH₂OH ⟶ (1)
(ethylene glycol)
II.
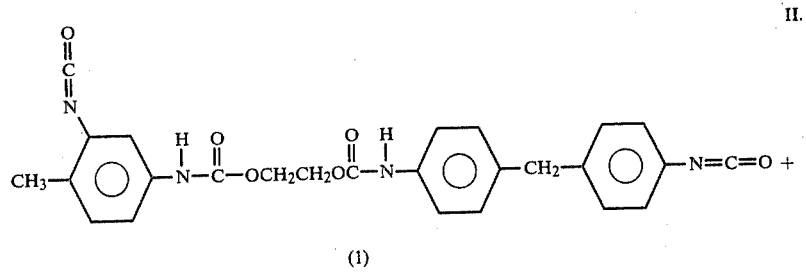
(1)
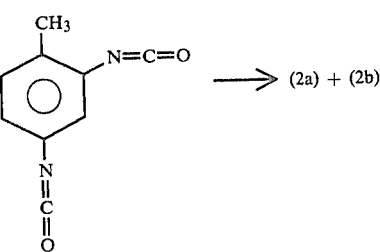
(2,4-TDI) ⟶ (2a) + (2b)
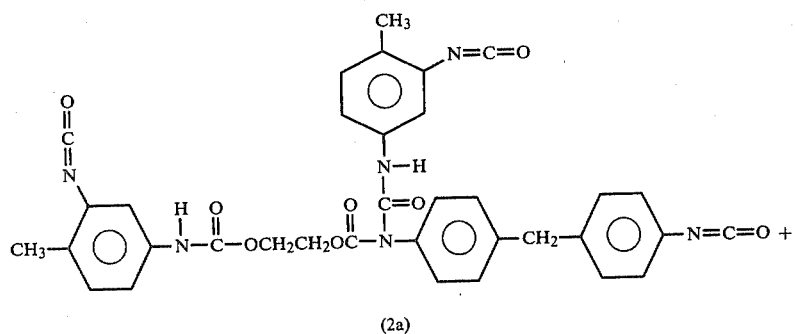
(2a)
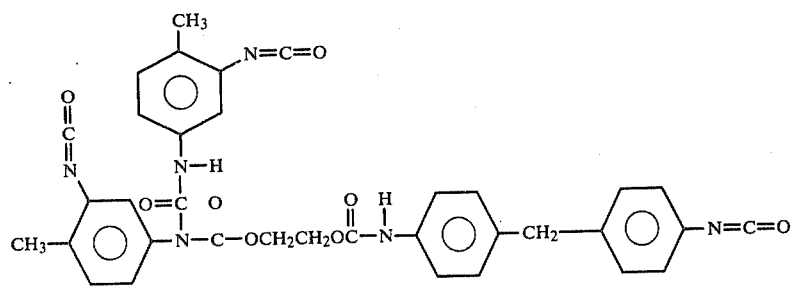
(2b)

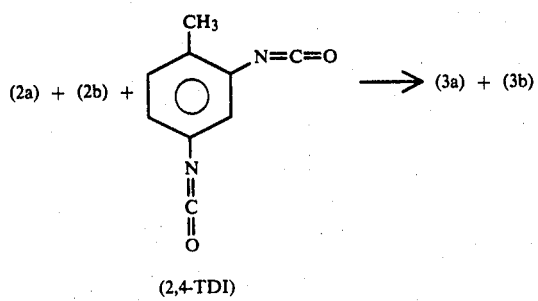

(2a) + (2b) + (2,4-TDI) ⟶ (3a) + (3b)

III.

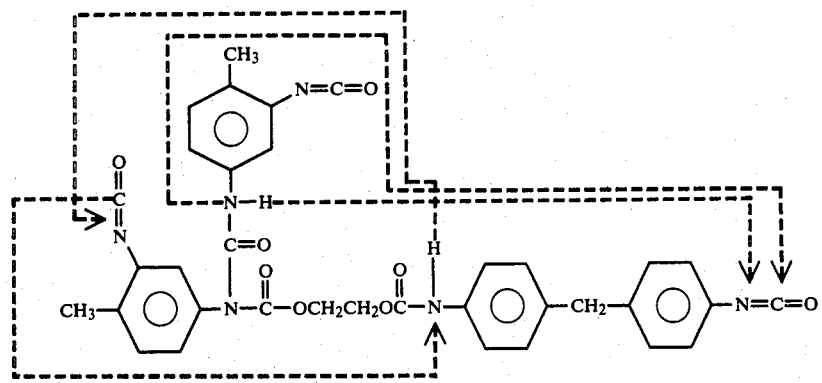

(3b)

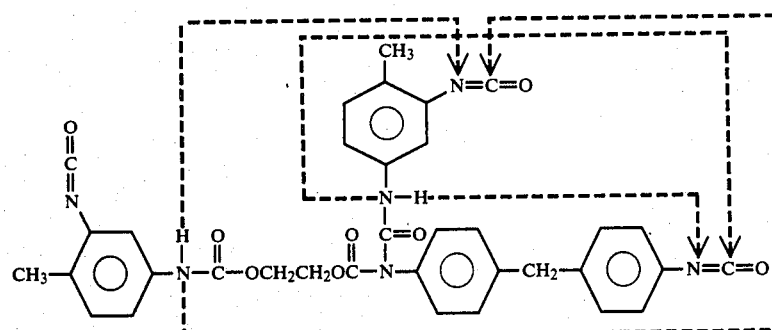

(3a)

At room temperature, the resin is a clear yellow brittle solid which has an indefinite shelf life, but which can be readily remelted for processing. 4,4'-MDI and only a portion of the 2,4-TDI is used in the reaction of Equation I to form polymer (1). The reaction of polymer (1) with another portion of the 2,4-TDI proceeds as shown in Equation II to form polymers (2a) and (2b). Proceeding further, as shown in Equation III, cross-linking occurs in polymers (2a) and (2b), with active hydrogens in the molecules and the remaining unreacted isocyanate groups cross-linked to form polymers (3a) and (3b) such as shown by the dash lines. The cross-linking thereby forms a network of structure of different molecules insoluble in any known common or exotic solvent and not meltable when cured to a solid.

Specific examples of the formulations of the reactants are shown in Table I as follows:

TABLE I

| EXAMPLE | REACTANT, MOLE-% | | |
|---|---|---|---|
| | MDI[1] | TDI[2] | EG[3] |
| A | 20.08 | 54.98 | 24.94 |
| B | 20.03 | 55.10 | 24.87 |
| C | 20.02 | 55.12 | 24.86 |
| D | 19.93 | 55.34 | 24.37 |
| E | 19.93 | 55.35 | 24.72 |

[1] 4,4'-diphenyl methane diisocyanate
[2] 2,4-toluene diisocyanate
[3] ethylene glycol, $C_2H_4(OH)_2$ In the liquid form, the resin is impregnated in 12 plies of high purity quartz cloth such as Astroquartz ® 581 manufactured by J. P. Stevens and Co., Inc.. It is then sealed in a Cellophane ® envelope and masking tape to contain any excess squeeze out polymer and also to serve as a parting agent for the cured polymer and press. The composite is then cured at 149° C. in a press of desired contour at 17–18 psi for 4–6 hours. The laminate is finally post cured in air at 157°–162° C. for 8–16 hours to enhance its properties.

The laminates impregnated and cured with the resins formulated according to the above examples exhibited electrical and physical characteristics in Table II as follows:

TABLE II

| RESIN EXAMPLE | RESIN WT-% | DIELECTRIC CONSTANT @ 68° F., 8.5GHz | LOSS TANGENT @ 68° F., 8.5GHz | FLEXURAL STRENGTH, PSI | | MODULUS OF ELASTICITY PSI × 10$^6$ | |
|---|---|---|---|---|---|---|---|
| | | | | ROOM TEMP. | 350° F. | ROOM TEMP. | 350° F. |
| A | 33.0 | 2.937 | .0104 | 66,182 | 60,082 | 3.02 | 2.12 |
| B | 36.3 | 2.942 | .0114 | 63,000 | 54,813 | 2.47 | 2.03 |
| C | 34.3 | 2.825 | .0039 | 65,130 | 53,565 | 1.87 | 1.63 |
| D | 35.7 | 2.827 | .0044 | 71,240 | 56,167 | 1.95 | 1.78 |
| E | 36.1 | 2.890 | .0137 | 70,265 | 57,900 | 2.34 | 1.86 |

Recent testing of composites according to the invention for behavior of its dielectric constant with changes in temperature reveal no significant change up to 800° F.

As shown in test data, the composite of the present polyurethane-quartz invention also exhibits rain erosion resistance very similar to a polyester and epoxy system currently used in aircraft radomes. It is thus apparent that the present invention achieves the objective herein set forth. A polymeric composite system has been produced for radome applications requiring increased radar transparency, i.e. a rigid polyurethane composite having a dielectric constant of 3 or less, a loss tangent of 0.015 maximum, and a structural strength comparable to current systems used in aircraft.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A method of fabricating a composite laminate with low dielectric constant and low loss tangent particularly useful in radomes, comprising:

heating a selected amount of 4,4-diphenyl methane diisocyanate to melt without polymerization;

mixing an effective amount of 2,4-toluene diisocyanate to form a mixture of selectively reactive diisocyanates;

adding to said mixture an effective amount of ethylene glycol to form a polymerized reaction product having an excess of isocyanate groups without cross-linking;

heating the reaction product for a controlled time and at a controlled temperature to increase the polymerization to form a polyurethane resin of proper viscosity for optimum wetting without cross-linking;

impregnating an effective amount of the resin in a plurality of plies of fibrous cloth to form a composite; and curing the composite under a controlled temperature and pressure for a predetermined time to produce a rigid polyurethane laminate by allophanate formation.

2. A method according to claim 1 wherein:

54.98 to 55.35 mole-percent 2,4-toluene diisocyanate is mixed with 20.08 to 19.93 mole percent 4,4'-diphenyl methane diisocyanate, respectively; and 24.94 to 24.72 mole-percent ethylene glycol, respectively, is added to said mixture.

3. A method according to claim 2 wherein:

the ethylene glycol is added at a controlled rate so the reaction temperature does not exceed 80° C.

4. A method according to claim 3 wherein the reaction product is maintained at 102° to 110° C. for 10 to 17 hours.

5. A method according to claim 4 wherein the composite includes 33.0 to 36.3 percent by weight resin.

6. A method according to claim 5 wherein the fibrous cloth is quartz.

7. A method according to claim 6 wherein the composite is cured at approximately 149° C. and 17 to 18 psi for 4 to 6 hours.

8. A method according to claim 7 further comprising:

post curing the composite in air at 157° to 162° C. for 8 to 16 hours.

* * * * *